ZISSIMOS ANGELO TYPALDOS
INVENTOR.

ATTORNEY

ZISSIMOS ANGELO TYPALDOS
INVENTOR.

BY

ATTORNEY

Nov. 29, 1960  Z. A. TYPALDOS  2,961,939
VEHICLE AIR CONDITIONING AND ACCESSORY DRIVE SYSTEM
Filed Aug. 12, 1955  7 Sheets-Sheet 6

ZISSIMOS ANGELO TYPALDOS
INVENTOR.

BY
ATTORNEY

United States Patent Office 2,961,939
Patented Nov. 29, 1960

2,961,939

VEHICLE AIR CONDITIONING AND ACCESSORY DRIVE SYSTEM

Zissimos Angelo Typaldos, Altadena, Calif., assignor, by mesne assignments, to Crane Co., Chicago, Ill., a corporation of Illinois Filed Aug. 12, 1955, Ser. No. 528,052

32 Claims. (Cl. 98—1.5)

This invention relates to a method and apparatus for conditioning air to be delivered to a compartment of a vehicle, such as an airplane, and also for driving accessory units incorporated in the vehicle. The invention further relates to novel control subcombinations which form components of the over-all system.

The cabin air conditioning and accessory drive requirements of present-day aircraft, and particularly jet-propelled military aircraft, are extremely severe and exacting, yet the air conditioning and accessory drive apparatus must be relatively small and light in weight. One important requirement is that bleeding of air from the jet engine compressors be maintained at the minimum commensurate with an adequate supply of conditioned air to the cabin and an adequate supply of power to the accessory units, since such bleeding of air represents power lost to the jet engine. Accordingly, the system must be extremely efficient and must use only a minimum of air in addition to that which is fed to the compartment being conditioned. A further important requirement of such systems is that they drive certain accessories, such as electric generators, at constant speed in order that radar and other components supplied with electric power by the generators will operate satisfactorily. Such constant speed operation is very difficult to achieve, particularly in view of a further requirement that a substantially constant mass or weight of air be fed to the cabin at all times and under all conditions, regardless of variations in jet engine speed or in the requirements of the load.

With respect to the above-mentioned requirement that a constant weight of air be fed to the cabin at all times, it has been found that in small, compact systems the measuring or sensing of the air flow is extremely difficult due to turbulence and spiraling of the air flowing past the measuring or sensing unit. Other difficulties inherent in such systems involve the prevention of excessive shaft speed, and the limitation of pressure in the air conditioning system to a certain maximum (which may be much less than the pressure of the air bled from the jet engine) in order that the components of the system need not be made excessively strong and heavy.

One of the greatest problems, that of providing a rotary device capable when in certain positions of supplying power to the load, when in other positions of braking the load, and when in other positions of shutting off the flow of excessive bleed air, has been solved with the hot turbine structure described and claimed in co-pending application Serial No. 528,041, now abandoned filed August 12, 1955, for a Combination Flow-Controlling and Power-Braking Turbine and assigned to the assignee of the present invention. The hot turbine structure is also described, in less detail, in the present specification.

In view of the above factors characteristic of cabin conditioning and accessory drive systems, it is an object of the present invention to provide a method and apparatus for supplying a predetermined mass flow of conditioned air to a passenger or other compartment to be conditioned, and also to drive accessory units at predetermined speeds, all with a minimum of bleeding of air from an air pressure source such as the compressor portion of a jet engine.

A further object is to provide a method and apparatus for supplying a predetermined constant mass flow of conditioned air to the cabin of an airplane, while at the same time driving accessory units of the airplane at a predetermined constant speed.

A further object is to provide refrigeration turbine means for cooling air and supplying the same to a cabin at a predetermined rate despite wide variations in the pressure and temperature of inlet air to the refrigeration turbine means in conjunction with means associated with the refrigeration turbine means for causing it to rotate at a constant speed at all times.

Another object is to provide novel means for sensing and regulating the flow of conditioning air to a compartment to be conditioned, and which are extremely sensitive and accurate in operation despite the compactness of the over-all unit and the shortness and bending of the conduits through which the conditioning air passes.

An additional object of the invention is to provide novel means for insuring that the rotating components of the cabin conditioning and accessory drive system never operate at an excessively high speed, in conjunction with means for limiting the pressure of the bleed air supplied from the air pressure source to the conditioning system in order that the components of the latter need not be made excessively strong and thus relatively heavy.

These and other more specific objects will appear upon reading the following specification and claims and upon considering in connection therewith the attached drawings to which they relate.

THE OVER-ALL SYSTEM AND METHOD

Figure 1:
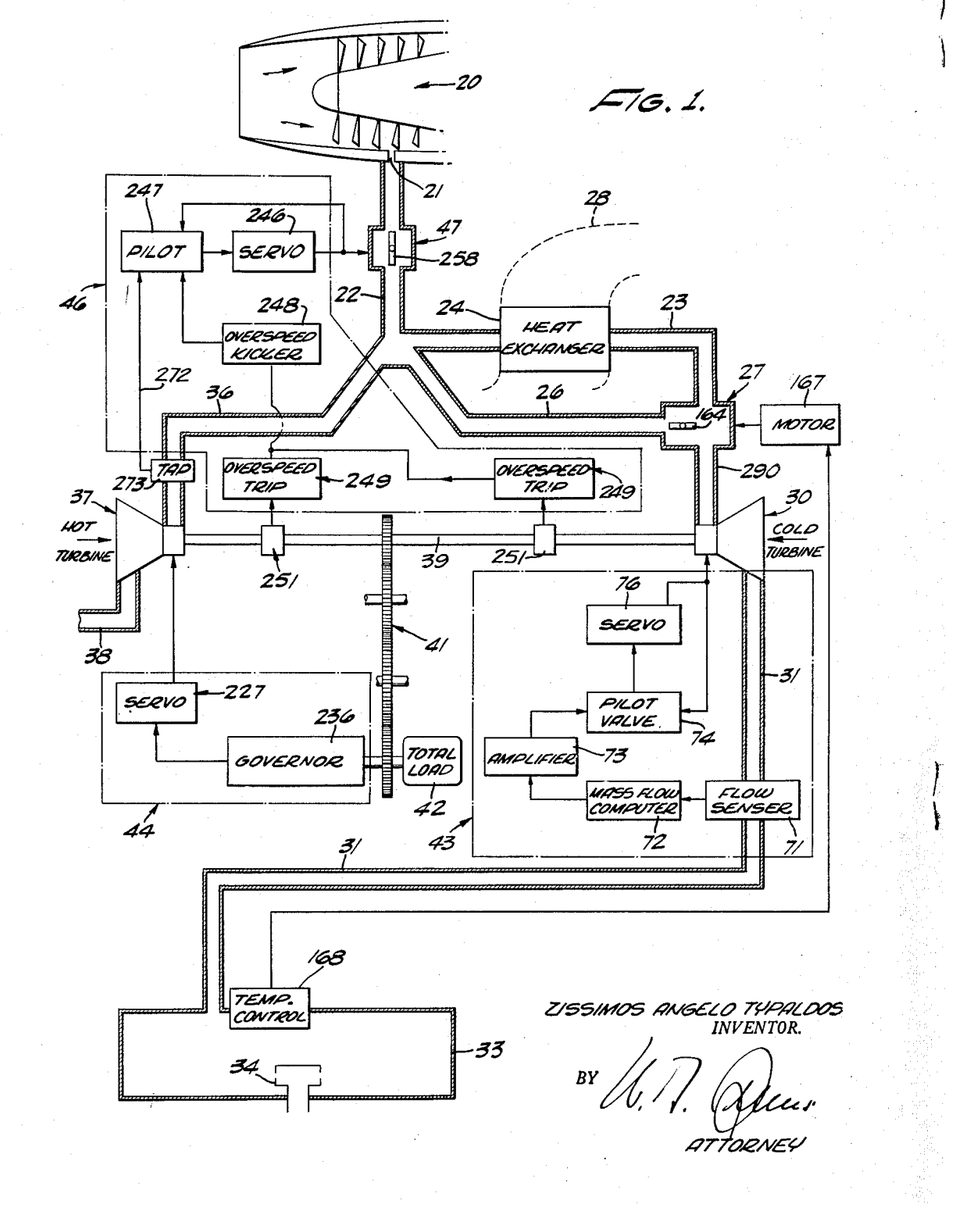
Figure 1 is a schematic representation of a cabin air conditioning and accessory drive system incorporating the present invention.

Referring particularly to Figure 1, the source of air under pressure is represented schematically at 20 as comprising the compressor portion of a jet engine. Relatively hot compressed air, hereinafter referred to as bleed air, is withdrawn from the jet engine compressor through a port 21 and into a bleed air conduit 22. From conduit 22 hot compressed air may flow through a conduit 23 and heat exchanger 24 contained therein, or through a bypass conduit 26, depending upon the position of a bypass valve 27 provided at the junction of conduits 23 and 26 and at their ends remote from conduit 22. The heat exchanger 24 may be of any suitable type adapted to effect cooling of the air which passes through conduit 23, and is supplied with a suitable coolant such as boundary layer air which flows through a duct 28 and discharges overboard.

The bypass valve 27 is connected through a conduit 290 to the inlet of a rotary expansion engine 30. As will be described subsequently, the expansion engine 30 preferably takes the form of a variable vane cooling or expansion turbine, and will be generally referred to as the "cold" turbine for purposes of simplicity of description. The outlet of cold turbine 30 connects to a conduit 31 leading to a compartment to be conditioned, for example the cabin 33 of an airplane. The pressure in the cabin 33, which is sealed against undesired discharge of air, is regulated by an escape valve indicated at 34 and which may be of any suitable type adapted to cause the cabin pressure to remain at a predetermined desired value. A suitable valve 34 is described in U.S. Patent Number 2,651,985, issued September 15, 1953, to W. H. Warstler.

In addition to the bleed air which flows from the jet engine compressor 20 through conduits 23 and 26 to cold turbine 30 and thus to the cabin 33, additional bleed air is fed through a conduit 36 to the inlet of a second rotary expansion engine 37. Conduit 36 is preferably connected to conduit 22 although it may, if desired, be connected directly to any suitable source of fluid pressure. Expansion engine 37 comprises a power-braking turbine combined with a flow-controlling valve which may operate to shut off, so that in the shut-off condition almost no air (i.e. no air except that required to cool the turbine 37) flows through conduit 36. For purposes of simplicity of description, the element 37 will be referred to as the "hot" turbine. The outlet or exhaust from hot turbine 37 communicates with any suitable space having a low back pressure, and is preferably connected to a conduit 38 which discharges to the ambient atmosphere. For example, conduit 38 may discharge into coolant air duct 28 downstream from the heat exchanger.

It is a primary feature of the invention that the cold turbine 30 and hot turbine 37 are associated with each other, preferably by mechanical means, in such manner that they operate conjointly in driving a load at a predetermined speed. In the illustrated example the rotors of the cold and hot turbines are mounted on a common shaft 39 which may, of course, be formed of several components connected together. Shaft 39 is connected, as through gearing indicated at 41, with a load 42 which may comprise a number of accessory units of the airplane, for example an alternator, a compressor and a generator. In the present illustration it is assumed that at least some of the accessory units must be operated at a constant speed, for example in order to supply electric power at constant frequency to radar elements, which means that the speed of shaft 39 must be maintained constant within close limits.

Proceeding next to a brief, general description of the control elements of the system, there is illustrated at the lower right portion of Figure 1 a group of controls which will be referred to as the mass flow control group 43. The mass flow control group is adapted to determine the weight of air which flows to the cabin 33, and in the illustrated system regulates the weight of air so that it remains substantially constant under all conditions, one representative constant being 40 pounds of air per minute. As will be described subsequently, the air flow is maintained constant, despite great variations in such factors as the pressure and temperature of air bled from the compressor 20, by sensing the flow of air through conduit 31 and then adjusting the nozzle vanes of cold turbine 30 in such a way that the air flow will be constant. The described constant air flow is extremely desirable in order to assure a proper supply of conditioned air to cabin 33, without excessive bleeding of air from the compressors, and is a basic requirement of air conditioners for many present-day aircraft.

The temperature in cabin 33 is regulated, under the control of the pilot of the aircraft, and by temperature control elements to be described hereinafter. These elements include motor means for varying the adjustment of bypass valve 27 and thus the relative proportions of air which flows through bypass conduit 26 and through heat exchanger 24. The motor means operate in response to a temperature control system associated with cabin 33.

As indicated previously, mass flow control group 43 adjusts the nozzle vanes of cold turbine 30 in such a way as to result in a constant mass flow of air to the cabin 33, despite wide variation in the pressure and temperature of the bleed air and in other factors. The regulation of the nozzle vanes of the cold turbine thus being independent of aircraft speed, it follows that the speed of shaft 39 and thus of load 42 will tend to vary, which is extremely undesirable since, as above stated, it is necessary that the load speed be maintained constant. In order to maintain the shaft speed constant despite the tendency of cold turbine 30 to vary in speed, the invention provides a speed control group 44 which operates to adjust the vanes of hot turbine 37 in such a way as to maintain the shaft speed constant under all conditions, and with a minimum of bleeding of air from jet engine compressor 20. In some positions of the vanes of hot turbine 37, the hot turbine acts as a source of power to make up for a deficiency in the power supplied by cold turbine 30. In other positions of the vanes of the hot turbine, it acts as a brake to hold down the speed of shaft 39 despite the fact that cold turbine 30 tends to supply an excessive amount of power thereto. In still other positions of the hot turbine vanes, it acts as a shut-off valve to block the flow of bleed air through conduit 36, so that the hot turbine then supplies no power to shaft 39 nor does it act as a brake, the cold turbine 30 then supplying power in an amount which just balances the load requirements.

Two important requirements of the cabin conditioning and accessory drive system are (1) that the turbines 30 and 37 and shaft 39 never rotate at an excessive speed to prevent the possibility that the turbines or load might fly apart and damage the airplane, and (2) that the weight of the system be maintained at a minimum. In the present system, weight is minimized by making components such as heat exchanger 24 relatively light and weak, which is possible since the pressure of air flowing therethrough is limited to a predetermined maximum such as 200 inches of mercury absolute. To limit the pressure, and also to insure that the rotating components never exceed a predetermined speed, the pressure limiting and overspeed control group 46 is provided as indicated at the upper left portion of Figure 1. This group controls the position of a throttle or shut-off valve 47 in conduit 22, the construction being such that the valve 47 is maintained fully open until the air pressure in the system reaches a specified maximum, after which the valve operates to modulate the flow of air in a manner to maintain the pressure in the system constant at the specified maximum. In addition, the group 46 operates to close the valve 47 should the speed of shaft 39 become excessive due to failure of operation of speed control group 44.

From the above brief description of the over-all system, it will be understood that the method of the invention comprises, in general, expanding a predetermined weight of air through an expansion engine to the compartment being conditioned, and regulating the speed of the expansion engine to a predetermined value despite the fact that indeterminate factors such as air pressure and temperature tend to result in wide variations in speed. More particularly, and with the illustrated apparatus, the method comprises passing bleed air from a jet engine compressor 20 through a first expansion turbine 30 at a predetermined, constant flow rate, and also passing varying quantities of bleed air from the jet engine compressor through a second expansion turbine 37 mechanically associated with the first turbine. The direction of air flow through the second turbine is regulated in such manner that it selectively supplements the power from the first turbine or removes power therefrom to the end that the load 42 driven by both turbines is operated at constant speed. Further steps in the method include limiting the maximum pressure of the air fed to the turbines, and causing the air flowing to the first turbine to pass selectively through a heat exchanger 24 or a bypass 26 in order to regulate the temperature of the pressurized compartment 33 to which the outlet air from the first turbine is conducted.

An important feature of the method and apparatus is that hot compressed air is fed directly through conduits 22 and 36 to hot turbine 37, and directly from the hot turbine through conduit 38 to the ambient atmosphere. Since the hot turbine air does not pass through a heat exchanger or through the cabin, there is a high temperature present at the hot turbine and a high pressure drop thereacross, which means that the hot turbine can produce much more power per pound of air than can the cold turbine. This high hot turbine efficiency, coupled with the ability of the hot turbine to block the flow of air therethrough when no supplemental power or braking action is required, is an important factor in producing a system having a much less bleed air consumption, over the entire range of airplane operation, than prior art air conditioning and drive units.

*The cold turbine 30 and the mass flow control group 43*

Figure 2:
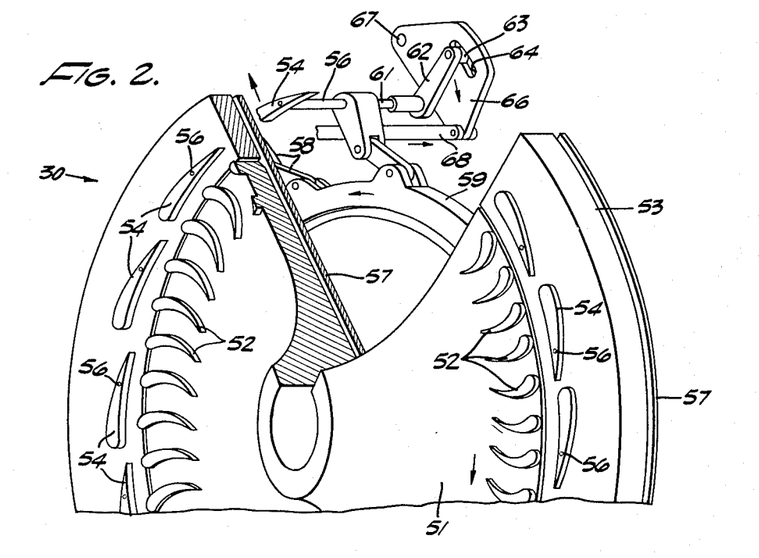
Figure 2 is a fragmentary perspective illustration of the cold or refrigeration turbine incorporated in the system, portions being broken away to illustrate the means for adjusting the nozzle vanes of the turbine.

The cold turbine 30, represented schematically in Figure 2, is preferably a radial inflow type with cantilevered blades. As indicated above, the cold turbine is intended to pass a constant supply of conditioning air to the cabin 33, while rotating at a constant angular speed, a feature made possible by the operation of hot turbine 37. The wheel or rotor 51 of the cold turbine is suitably keyed to shaft 39 and is provided about its periphery with a substantial number of rigid correspondingly curved blades 52. A stationary nozzle ring 53 encircles the turbine wheel 51 and has mounted thereon, radially outwardly of rotor blades 52, a substantial number of adjustable nozzle vanes 54. Each vane 54 is fixed to the forward end of a shaft 56 which extends rotatably through nozzle ring 53, and also through the adjacent stationary back plate or casing component 57. The inner or rear end portion of each shaft 56 is provided with a crank which forms part of a linkage 58 connecting with a rotatable actuating or control ring 59.

All of the nozzle vanes 54 being mechanically linked to the actuating ring 59 as indicated, rotation of the ring 59 about its axis effects a corresponding adjustment of the nozzle vanes 54 and in such manner as to vary the volume of air flowing through the turbine. It is pointed out, however, that the nozzle vanes 54 are spaced sufficiently far apart circumferentially of rotor 51 that even in their maximum closed positions some air is permitted to flow therebetween. This minmum opening is maintained in order to allow sufficient air passage to effect starting of the turbine.

Figure 3:
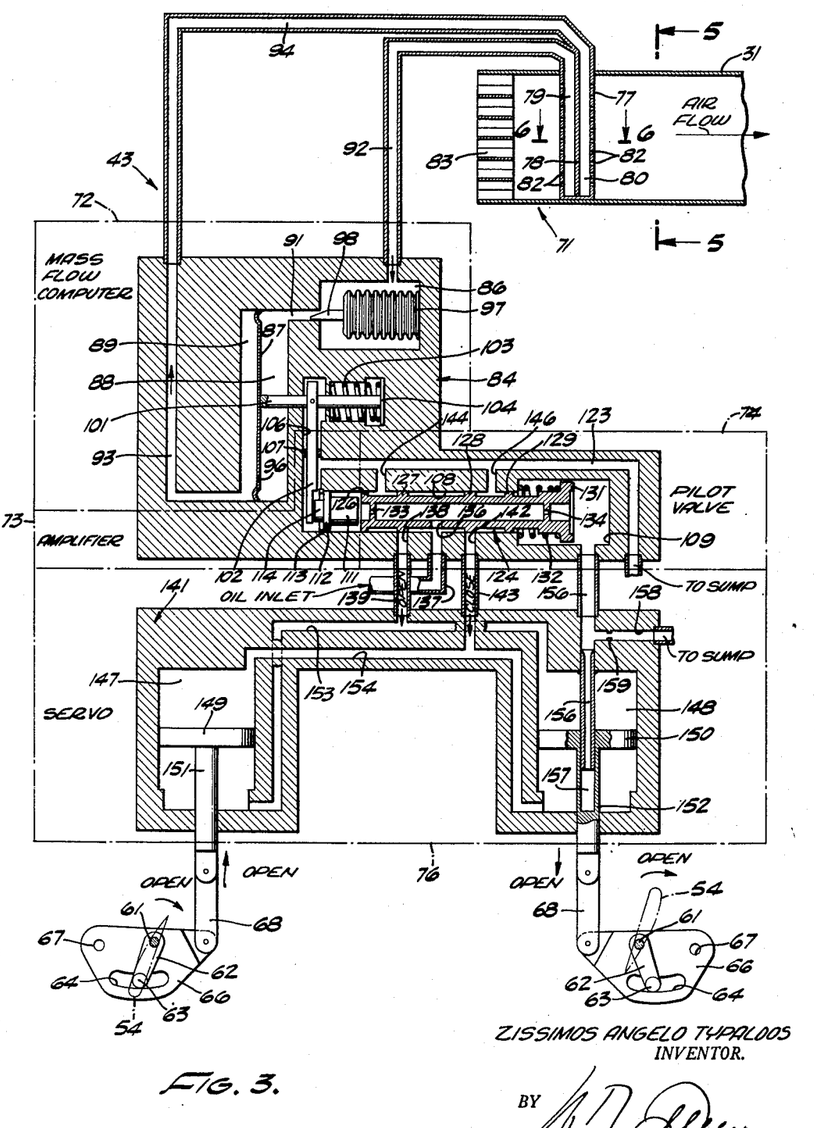
Figure 3 is a schematic representation of the mass flow control group which operates to effect the supply of a predetermined weight of air to the cabin under all conditions.

In order to effect rotation of the actuating ring 59 and thus control the nozzle vanes 54, two diametrically opposite shafts 56 are provided with axial extensions 61 having cranks 62 at their rear end portions. At the outer ends of the cranks 62 are provided cam follower rollers 63 which extend into curved cam slots 64 in cam plates 66, the latter being pivoted at 67 to the turbine casing. Connected to the respective cam plates, remote from pivot points 67, are actuating rods 68 which are associated, as shown in Figure 3, with servo piston components of the mass flow control group 43. The construction of the cam plates and cam slots is such that upon shifting of the actuating rods 68 in the directions indicated by the arrows in Figures 2 and 3, the remaining components will also shift in the directions indicated by the arrows to effect movement of the nozzle vanes 54 to a more open position.

The linkages and cam slots are so constructed that the nozzle vane rotation is not linear with displacement of the actuating rod 68, the arrangement being instead non-linear. The non-linearity is such that equal increments of movement of the actuating rods 68 will produce the same percent decrease or increase in the nozzle area, so that the sensitivity is the same throughout the range of servo piston travel. This construction therefore prevents the nozzle opening or area from being varied excessively by a small movement of actuating rods 68 as the nozzle vanes approach their closed positions.

It is to be understood that the unshown casing of cold turbine 30 is provided with a suitable inlet scroll which feeds inlet air from conduit 29 through the nozzle openings defined by nozzle vanes 54. The air then expands radially inwardly between the rotor blades 52, after which the expanded air is passed through an axial outlet connection to conduit 31. The mass flow control group 43 then operates, under the control of a flow senser which senses the rate of air flow to cabin 33, to shift the two actuating rods 68 (Figure 3) and rotate cam plates 66 in such a way that actuating ring 59 is rotated until all of the nozzle vanes 54 are in corresponding positions which maintain the predetermined constant rate of air flow to the cabin.

The mass flow control group 43 will next be described, and with particular reference to Figures 1 and 3–6. This group comprises a mass flow senser 71, a mass flow computer 72, an amplifier 73, a pilot valve 74, and the servo 76 which connects through rods 68 to the cold turbine nozzle vanes in the manner previously described. As indicated diagrammatically in Figure 1, the operation of the mass flow senser is straightforward, except for a feedback between the servo 76 and the pilot valve 74. The various blocks indicated in Figure 1 to represent the elements 72, 73, 74 and 76 are represented by dashed line enclosures in the schematic showing of Figure 3.

Referring first to the flow senser 71, this element is preferably mounted in the conduit 31 between the cold turbine outlet and cabin 33. Although the flow senser 71 is shown as disposed a substantial distance from the cold turbine, it is to be remembered that Figure 1 showing is highly schematic and that in the actual compact cabin conditioning unit the flow senser may be disposed very close to the cold turbine outlet. Furthermore, the conduit 31 on both sides of the senser may, for compactness, necessarily be curved. Because of these factors, the air flow through conduit 31 may be irregular and may spiral instead of flowing axially along straight paths. The present senser 71 is, however, constructed to produce an accurate indication of mass flow despite such irregularity and spiraling of the air flow.

Figure 5:
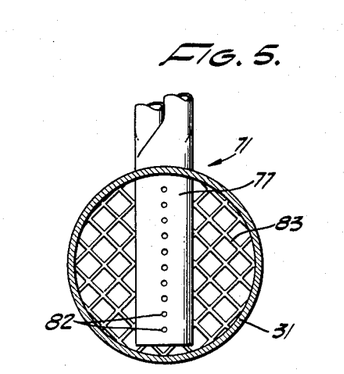
Figure 5 is a section taken along line 5—5 of Figure 3 and illustrating the flow sensing means.
Figure 6:
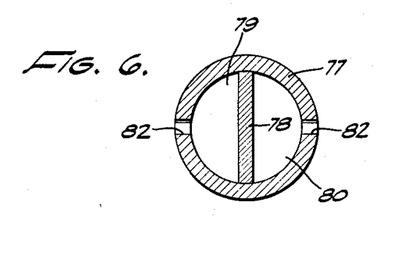
Figure 6 is an enlarged, fragmentary sectional view taken along line 6—6 of Figure 3.

As shown in Figures 3, 5 and 6, the sensor 71 comprises a tube 77 mounted diametrically of conduit 31 and divided by a baffle 78 into upstream and downstream manifold conduits 79 and 80, respectively. Formed on the upstream and downstream sides of tube 77, and diametrically opposite each other in a common plane extending longitudinally of conduit 31, are two rows of relatively small diameter holes 82, the rows extending for substantially the full diameter of the conduit.

Since, due to the small diameters of holes 82, the air flow resistance offered by the holes is much greater than that offered by the relatively large size manifold conduits 79 and 80, the pressures in the manifold conduits represent, respectively, the average of the upstream and downstream pressures across the diameter of conduit 31. The pressure in upstream manifold conduit 79 represents the dynamic pressure head in conduit 31, whereas the pressure in downstream manifold conduit 80 is somewhat less than the static pressure head in conduit 31. The use of upstream and downstream holes 82 therefore produces a maximum pressure difference between conduits 79 and 80.

In order to eliminate the spiraling in conduit 31 due to the above-mentioned relatively small distance between the senser 71 and the cold turbine, and possibly also due to curvature in the conduit 31, a flow-straightening grid 83 is provided adjacent tube 77 on upstream side. This grid is preferably shaped with a large number of rectangular passages having sufficient axial extent to straighten out the spiral air flow into a plurality of axially flowing streams which merge into one large stream within conduit 31 downstream and before reaching conduits 79 and 80.

Referring next to the mass flow computer 72, this element is schematically represented in Figure 3 and is provided within a suitable casing 84. Casing 84 defines a bellows chamber 86 and a diaphragm chamber, the latter being divided by a flexible diaphragm 87 into a high pressure chamber 88 and a low pressure chamber 89. The high pressure chamber 88 communicates through a passage 91, adjacent the edge of diaphragm 87, with bellows chamber 86 and thus, through a pressure tap line 92, with the upstream manifold conduit 79 of mass flow senser 71. Low pressure chamber 89 communicates, at a point remote from passage 91, through a passage 93 and pressure tap line 94 with downstream manifold conduit 80.

From the above description of the pressure connections to chambers 88 and 89 on opposite sides of the diaphragm, it might be supposed that the pressure across the diaphragm is the same as that developed by the mass flow senser 71. This, however, is not the case since a small amount of air flow is permitted through an orifice 96 which bypasses the diaphragm. In the illustrated form, orifice 96 is provided through the diaphragm at a point adjacent the outlet to passage 93. The pressure in chamber 88 depends upon the relative areas of the orifice 96, which is fixed in area, and the passage 91 the cross-section of which is variable in effective flow area by means next to be described.

The means for varying the area of passage 91 comprise a bellows 97 which is sealed and is filled with an expansible element such as dry nitrogen gas, the bellows being fixed at one end to casing 84 and being provided at the other end with a tapered projection 98 extending into passage 91. It follows that if a high pressure is transmitted from the senser 71 to bellows chamber 86, the bellows will contract to effect an increase in the effective flow area of passage 91 so that a relatively high pressure will be developed in chamber 88. This pressure in chamber 88 will be somewhat lower, however, if the temperature of the air transmitted from the senser to the bellows chamber 86 is high, since in that event the bellows will tend to expand and thus reduce the cross-sectional area of passage 91. Since the mass flow through conduit 31 tends to go up as pressure increases and down as temperature increases, it follows that the bellows 97 compensates for both pressure and temperature to vary the area of passage 91 in a desired manner determined by the taper of projection 98.

To summarize, therefore, the bellows 97 and projection 98 operate in response to pressure and temperature to determine the proportion of the available pressure drop (developed by senser 71) which is imposed on the diaphragm 87. It is pointed out that the diameter of the fixed orifice 96 is small, preferably less than .050 inch, so that the air flow in the pressure taps is not sufficiently great to disturb the operation of the flow senser 71. It is also pointed out that the relatively small but continuous air flow, indicated by the arrows in Figure 3, causes the temperature in bellows chamber 86 to be representative of that actually existing in the conduit 31, since if there were no flow any temperature transmission between conduit 31 and the bellows chamber 86 would normally be too small to produce the desired relationship.

The deflection of diaphragm 87 produced by the pressure difference between chambers 88 and 89 is transmitted through a stem 101 to a lever 102, the latter being pivoted to the central portion of the stem. One end of stem 101 is secured to diaphragm 87, and the other end thereof extends into a chamber in which is disposed a compression spring 103 which acts against a disc 104 secured to the stem. The spring therefore opposes the tendency of the higher pressure in chamber 88 to deflect diaphragm 87 to the left as viewed in Figure 3. Lever 102 extends downwardly through a passage 106 in which is provided a combined fulcrum member and seal 107. Member 107 not only provides a pivot for the lever, but also serves to seal off chamber 88 and the spring chamber from the oil employed in the amplifier and pilot elements next to be described.

Figure 4:
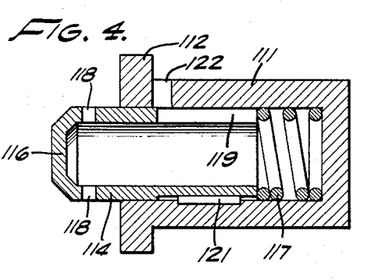
Figure 4 is an enlarged, sectional view of the amplifier unit illustrated in Figure 3.

In order to receive the amplifier and pilot elements, casing 84 is provided with an elongated bore 108 which communicates at one end with the passage 106 for lever 102, and at the other end with a somewhat larger chamber 109. The amplifier 73 comprises a cylindrical casing 111 mounted in the end of bore 108 adjacent lever 102, the casing having a radial flange 112 which bears sealingly against a stop ring 113 at the extreme end of the bore. As best shown in Figure 4, casing 111 is cupped to slidingly receive a poppet element 114 which is generally tubular except for its closed end 116. The latter projects out of casing 111 and into engagement with the end of lever 102, under the bias of a very soft compression spring 117 provided between the bottom of casing 111 and its own inner open end. Poppet 114 is provided adjacent its closed end 116 with radial ports 118, and adjacent its open end with a longitudinally extending slot 119. A key 121 between the poppet and its casing prevents rotation of the poppet, so that slot 119 is maintained in alignment with a casing port 112.

With the above-described construction, it will be seen that the degree of registry between port 122 and slot 119 is dependent upon the position of poppet 114 in the casing 111, which in turn depends upon the position of the lower end of lever 102 as governed by diaphragm 87. The rate of bleeding of oil from bore 108 through port 122, slot 119 and ports 118 is thus varied in accordance with the position of the lever 102. The oil thus bled from bore 108 passes through a passage 123 which communicates at one end with passage 106 and at the other end with a sump, not shown.

The pilot valve 74 comprises a spool 124 having four axially spaced lands 126—129 which sealingly engage the wall of bore 108. The end of spool 124 remote from amplifier 73 extends into chamber 109 and is there provided with a radial flange 131 which seats a compression spring 132 abutting at its opposite end the wall of chamber 109 adjacent the bore 108. The spool 124 is hollow and is provided adjacent its ends with restricted orifices 133 and 134, through which oil may pass upon being fed into the spool through a port 136 and through an oil inlet 137 into bore 108. Inlet 137 is connected to a suitable source of oil, preferably under a relatively high pressure such as 500 pounds per square inch.

The various pressure areas of the spool 124, as well as the strength of spring 132, are such that the spool will normally remain in the neutral position illustrated in Figure 3. When in that neutral position, land 127 blocks an outlet passage 138 which connects to a conduit 139 leading to the casing 141 of servo 76. Similarly, land 128 blocks an outlet passage 142 leading through a conduit 143 to casing 141. At all times, land 126 prevents flow of oil, except through orifice 133, into the portion of bore 108 surrounding amplifier casing 111 and similarly land 129 prevents flow of oil into chamber 109 except through orifice 134.

In the operation of the pilot valve 74, as thus far described, oil flows through inlet 137 and port 136 into the hollow center of the spool, after which it flows at a restricted rate through the orifice 133 into the portion of bore 108 surrounding amplifier casing 111. It then flows inwardly (Figure 4) through port 122 in the amplifier casing, through slot 119, and out through ports 118 into passage 106 leading to passage 123 and the sump. Should a pressure increase in conduit 31 operate through diaphragm 87 to pivot lever 102 counterclockwise as viewed in Figure 3, amplifier poppet 114 is pushed further into its casing 111 to restrict the communication between amplifier port 122 and slot 119. Pressure then builds up in the portion of bore 108 surrounding casing 111, causing spool 124 to shift to the right as viewed in Figure 3. Inlet 137 is then connected, through bore 108 between lands 127 and 128, with passage 142 and conduit 143 to effect closing of the vanes of the cold turbine through operation of servo 76 next to be described. Conversely, the sump is connected through passage 123 and a passage 144 to the portion of bore 108 between lands 126 and 127, and thus to passage 138 and conduit 139 to the servo casing and in a manner to permit draining of oil therefrom as will be described. The reverse operation occurs if there is a pressure drop in air conduit 31, in which event the spool 124 shifts to the left due to a pressure drop in the portion of bore 108 surrounding amplifier casing 111. Pressure is then fed from the pilot valve outwardly to servo 76 through passage 138 and conduit 139, and fluid is drained from the servo through conduit 143 and passage 142 to bore 108 between lands 128 and 129, and thus through a passage 146 to the passage 123 leading to sump.

The servo 76 comprises two piston chambers 147 and 148 formed in casing 141 and having, respectively, pistons 149 and 150 reciprocably mounted therein. The pistons 149 and 150 connect through their respective piston rods 151 and 152 to the actuating rods 68 leading to cam plates 66 previously described. A passage 153 communicating with conduit 139 is connected in parallel to the lower end of chamber 147 and the upper end of chamber 148. Conversely, a passage 154 communicating with conduit 143 is connected in parallel with the upper end of chamber 147 and the lower end of chamber 148. Passages 153 and 154 are connected to opposite ends of the piston chambers in the manner described because of the fact that the cam plates 66 are on diametrically opposite portions of actuating ring 59 (Figure 2) as previously described in connection with the cold turbine 30.

In order to stabilize the operation of the mass flow control group 43, and prevent over travel of pilot valve 74 and servo 76, feedback means are provided as will next be described. The feedback means comprise a passage 156 extended between chamber 109 and a feedback chamber 157 positioned within the rod 152 for piston 150. In the illustrated schematic representation, passage 156 extends through a conduit between casings 84 and 141, a portion of casing 141, and a tubular stem which is welded or press fit into casing 141 and slidably extended into the feedback chamber 157. A passage 158 communicates with passage 156 and leads to the sump, there being a restrictor or orifice 159 provided in the passage 158.

With the described feedback construction, oil from the inlet 137, and at a relatively high pressure, is passed through port 136 and into the center of spool 124. The oil then passes through orifice 134 into chamber 109, after which it passes through passage 156 to feedback chamber 157, and also through restrictor 159 to the sump. The two orifices 134 and 159 are thus connected in series and result in a pressure within chamber 109 and within feedback chamber 157 which is very much less than that at inlet 137. This pressure between the orifices remains constant, however, so long as spool 124 and piston 150 are stationary, it being understood that the pressure within chamber 109 provides an important effect in balancing spool 124 in the neutral position shown in Figure 3.

In the over-all operation of mass flow control group 43, let it be assumed that there is a pressure drop or a temperature rise in conduit 31 which results in expansion of bellows 97 to reduce the air flow through passage 91 and into chamber 88 on the right side of diaphragm 87. This results in clockwise pivoting of lever 102 to permit poppet 114 to be biased to the left (Figures 3 and 4) and thus increase the rate of bleed through ports 122 and 118 and slot 119 from the left end of bore 108. The pilot valve spool 124 then shifts to the left, causing introduction of high pressure oil through passage 138 and conduit 139 into passage 153, and in draining of oil out of passage 154 and through conduit 143 and passage 142 to passages 146 and 123 and the sump. It follows that piston 149 is shifted upwardly and piston 150 is shifted downwardly, which operates through the cam plates 66 to rotate the nozzle vanes 154 (Figure 2) in a direction to open them and effect flow of a greater volume of air through the cold turbine 30 as is necessary to compensate for the decrease in pressure or rise in temperature in conduit 31.

When piston 150 moves downwardly as described, the effective volume within feedback chamber 157 is increased, so that the pressure in chamber 109 and acting against the right end of spool 124 is decreased to such an extent that spool 124 shifts to the right or back to its original neutral position. The spool 124 is thus reset to its original position in time to prevent excessive shifting of the nozzle vanes 54, so that operation is stabilized and the mass flow of air through conduit 31 remains substantially constant as desired.

Should there be a pressure rise in conduit 31, or else a temperature drop therein, a converse operation occurs by which bellows 97 contracts and the flow of air through the passage 91 is increased accordingly. Diaphragm 87 is thus shifted to the left and lever 102 is pivoted counterclockwise to shift poppet 114 to the right and decrease the rate of bleeding from the left end of bore 108. The resultant increased pressure to the left of spool 124 therefore effect shifting of the spool to the right, whereupon passage 138 connects to the sump and passage 142 connects to oil inlet 137. It follows that piston 149 then moves downwardly and piston 150 moves upwardly to effect rotation of nozzle vanes 54 in a direction to close them and decrease the volume of air flowing through the cold turbine. When the piston 150 moves upwardly, the volume of feedback chamber 157 is reduced and the pressure between orifices 134 and 159 is increased to provide an increased pressure in chamber 109, tending to push spool 124 to the left or back to its illustrated neutral position. The feedback operation is thus substantially the same for both opening of the vanes and closing of the vanes, and mass flow of air through conduit 31 to the airplane cabin is substantially constant under all conditions.

*Cabin temperature controls*

Figure 7:
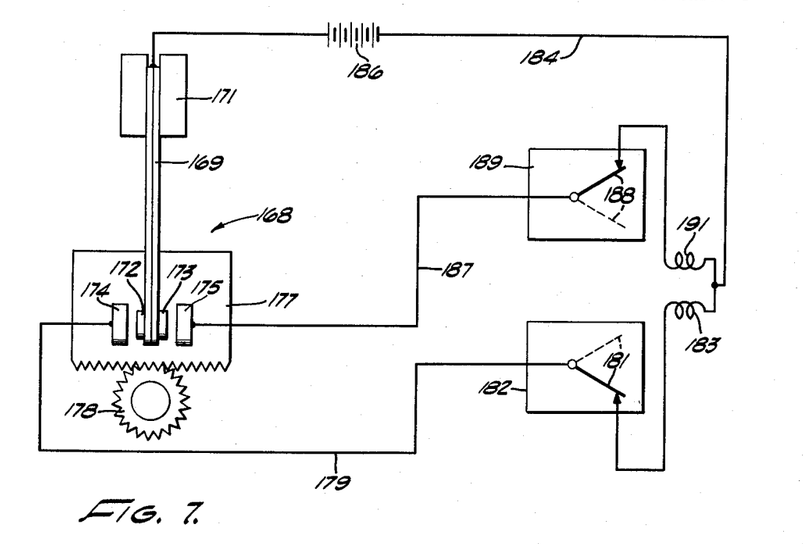
Figure 7 is a schematic representation of a means for controlling the temperature of the air within the compartment being conditioned.
Figure 7A:
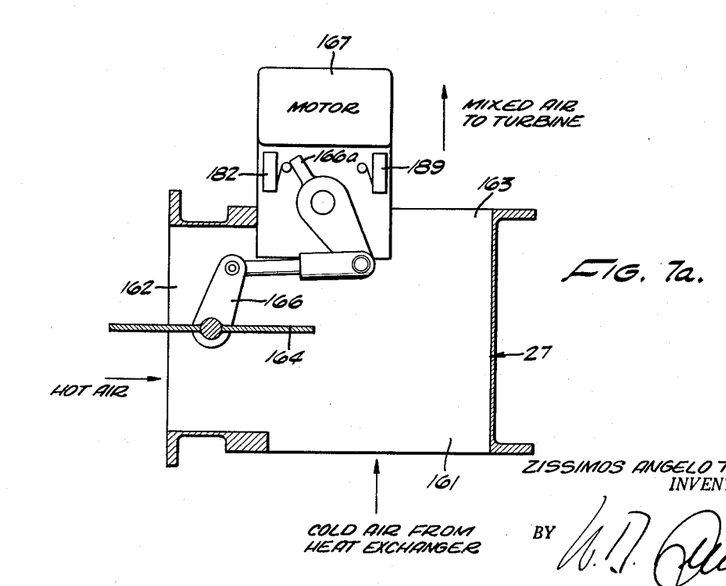
Figure 7a is a sectional view of the bypass valve for controlling the amount of air which flows through the heat exchanger of the system, and which is operated by the temperature control means illustrated in Figure 7.

Referring to Figures 1 and 7a, the bypass valve 27, which regulates the proportional flow of bleed air through heat exchanger 24 and through bypass conduit 26, includes a port 161 leading to conduit 23 and thus to heat exchanger 24, a second port 162 leading to the bypass conduit 26, and a third port 163 leading to conduit 29 and thus to the cold turbine 30. A butterfly 164 mounted in port 162 serves to selectively block the flow of air through bypass 26. It will be understood that bypass conduit 26 presents a lesser impedance to the flow of air than does heat exchanger 24, so that when butterfly 164 is fully open the great majority of the bleed air will flow through the conduit 26 and not through the heat exchanger. However, when butterfly 164 is closed, all of the air to the cold turbine will flow through heat exchanger 24 as is necessary when a relatively great cooling operation is required.

Butterfly 164 is connected through a non-linear linkage 166 to a reversible electric or hydraulic motor 167 operated in response to the temperature in cabin 33. Motor 167 serves to rotate butterfly 164 in the direction necessary to provide hotter or colder air to turbine 30 and thus to the cabin.

It is to be understood that a number of types of temperature controls may be provided for the purpose of operating motor 167 as required to rotate butterfly 164 between open and closed positions, or to an intermediate position. A control which may be employed is represented at 168 in Figures 1 and 7 and is seen to comprise a bimetallic strip 169 fixedly connected at one end to a support 171, and carries electrical contacts 172 and 173 at its opposite end. Contacts 172 and 173 are disposed, respectively, to engage contacts 174 and 175 both of which are mounted on a movable plate 177 having rack teeth on one edge thereof. Meshed with the rack teeth is a pinion 178 which is associated with a knob, not shown, adapted to be turned by the pilot of the aircraft in order to shift the position of contacts 174 and 175 and thus select the range of temperature within the airplane cabin 33.

Contact 174 is connected through a lead 179 to the arm 181 of a limit switch 182, the latter being associated with motor 167 and being actuated by an extension 166a of linkage 166 when butterfly 164 is fully open as indicated. The remaining terminal of switch 182 connects to one winding 183 of motor 167. Winding 183 connects through a lead 184 to the bimetallic strip 169, a direct current source 186 being interposed in lead 184 as indicated.

Contact 175 connects through a lead 187 to the arm 188 of a second limit switch 189. Switch 189 is also associated with motor 167 and is operated when butterfly 164 is fully closed. The remaining terminal of switch 189 connects to a second winding 191 of motor 166 and thus to the lead 184.

It is to be understood that motor windings 183 and 191 are respectively adapted, when traversed by direct current from source 186, to effect rotation of the motor rotor and thus butterfly 164 in a direction to open the bypass valve and in a direction to close it. It is also to be understood that both switches 182 and 189 are normally closed, or in the positions shown in solid lines in Figure 7. However, switch arm 181 is, due to operation of switch 182 by the linkage extension 166a as shown in Figure 7a, shifted to its open or dashed line position when butterfly 164 is open.

Assuming that butterfly 164 is initially open as shown in Figure 7a, so that switch 182 is open, let it be assumed that the cabin temperature increases until bimetallic strip 169 bends to the right in Figure 7 and contact 173 comes into engagement with contact 175. A circuit is then completed from direct current source 186 through strip 169 and switch 189 to energize winding 191 and cause operation of motor 167 in a direction to close the butterfly 164. This closing operation continues until contacts 173 and 175 disengage, or until switch 189 is opened when engaged by the linkage extension. The bypass 27 thus being closed, a greater proportion of air flows through heat exchanger 24 and a cooling effect is provided to result in lowering of the cabin temperature. It is pointed out that when the linkage extension shifts away from switch 182, the latter returns to its closed or solid line position.

Should the cabin temperature decrease, strip 169 bends to the left and causes contact 172 to engage contact 174. A circuit is then completed through switch 182 and winding 183, causing motor 167 to rotate butterfly 164 back to its open position. The cabin temperature is thus maintained within a range determined by the positioning of contacts 174 and 175, which in turn depends upon the position of pinion 178 as set by the pilot of the plane.

Suitable flap and ejector means may be associated with duct 28, and controlled in sequence with bypass valve 27, in order to increase the flow of coolant air through heat exchanger 24 if a further cooling action is required. It is also to be understood that water cooling means, or a refrigeration cycle employing Freon or the like, may be utilized to increase the cooling effect of heat exchanger 24 if necessary.

*Description of hot turbine 37 and speed control group 44*

Figure 8:
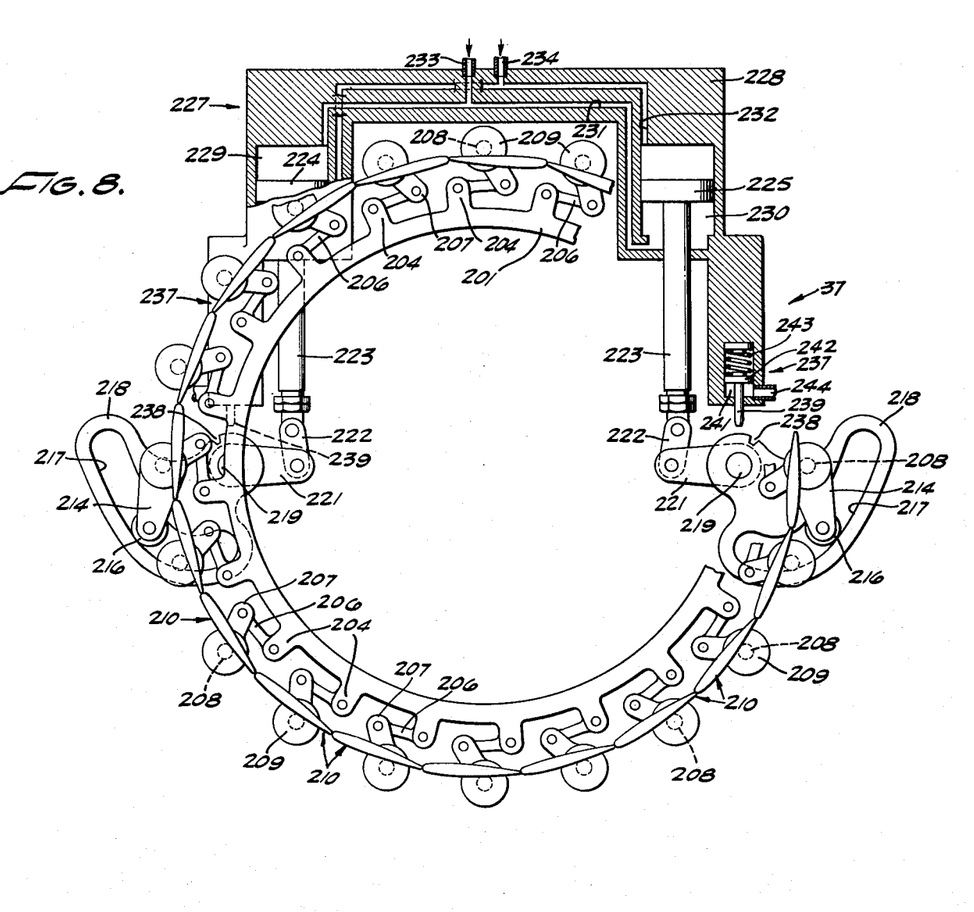
Figure 8 is a schematic representation of the nozzle vanes and vane-actuating means of the hot or power-braking turbine and valve, illustrating the vanes in their closed position adapted to shut off the flow of excess bleed air from the jet engine compressor.
Figure 9:
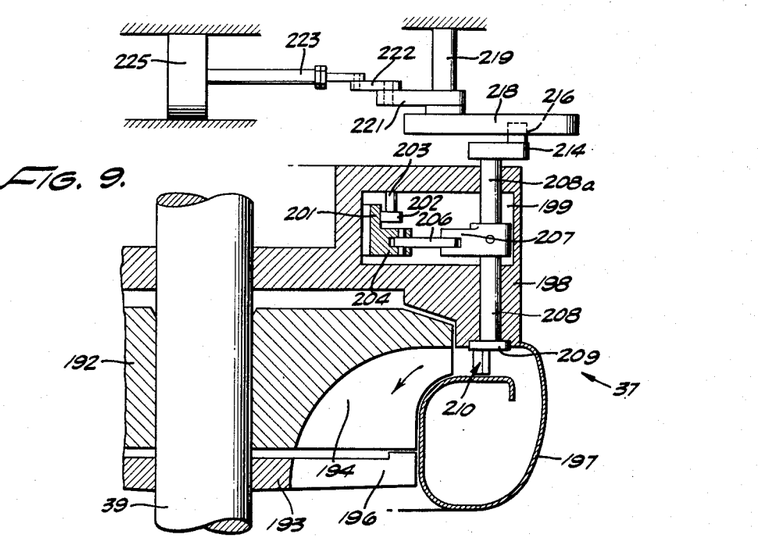
Figure 9 is a schematic fragmentary sectional view taken axially of the hot turbine.
Figure 10:
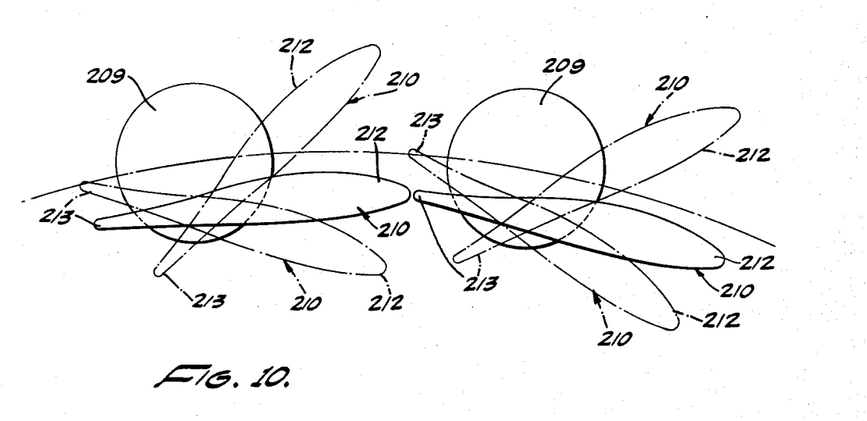
Figure 10 is an enlarged, highly schematic, fragmentary view illustrating a pair of adjacent vanes of the hot turbine in their closed or shut-off positions, their maximum power positions, and their maximum braking positions.

The hot turbine 37 is described in detail in the co-pending application, Serial No. 528,041, previously referred to and is shown schematically in Figures 8–10 of the present drawings. Referring first to Figure 9, a turbine wheel 192 and an exducer 193 are keyed or otherwise secured on the shaft 39 by suitable means, not shown. The wheel and exducer have the same number of blades, for example 13, and each is formed of a temperature resistant alloy since it may, when the turbine is acting as a brake, be exposed to temperatures on the order of 1100° F. to 1300° F. Blades 194 of the turbine wheel are of the straight radial type, each lying in a longitudinal plane, but the exducer blades 196 are twisted. The hot turbine is of the radial inflow type in which a scroll 197 is provided to receive inlet air from conduit 36, the air then flowing through the nozzle vanes of the turbine and radially inwardly between blades 194 for axial discharge between exducer blades 196 to conduit 38.

Formed in the casing 198 of the hot turbine 37 is an annular chamber 199 in which is mounted a vane actuating ring 201, the latter being best shown in Figure 8. Ring 201 is journaled in a plurality of circumferentially spaced bearing rolls 202 which in turn rotate on shafts 203 projecting from the rear wall of chamber 199. The bearing rolls 202 are shown in Figure 9 but are omitted from Figure 8 for the purposes of simplicity of illustration.

Formed about the circumference of actuating ring 201 are a plurality of outwardly extending radial lugs 204 each of which connects through a pivoted link 206 to a crank 207 on a shaft 208. Each shaft 208 is journaled in the portion of casing 198 between chamber 199 and scroll 197, and has fixedly mounted on its end remote from crank 207 a disc 209 which is recessed into the casing 198. Each disc 209 has welded or otherwise fiexedly associated therewith a nozzle vane 210, the vane being disposed in an eccentric or off-center position relative to the disc 209 and shaft axis as illustrated in Figure 10.

Referring to Figure 10, each nozzle vane 210 is streamlined and is formed with a relatively thick or blunt nose 212 and with a narrow tapered tail 213. The lengths of the vanes 210, and the circumferential spacing of discs 209, shafts 208, etc., are such that when the vanes are closed they lie along a circle having the axis of shaft 39 as its center. The nose 212 of each vane is then relatively close to the tail 213 of the adjacent vane, as illustrated in solid lines in Figures 8 and 10, which means that flow of air from scroll 197 and radially inwardly through the turbine is substantially blocked. Thus, when the vanes are in the closed position illustrated in solid lines, there is relatively little flow of bleed air from jet engine compressor 20 through the hot turbine, and substantially all flow is through the cold turbine 30 to cabin 33 as desired for efficient ventilating operation of the system without excessive power loss to the jet engine. There must, however, be sufficient spacing between the hot turbine vanes to permit flow of sufficient air to prevent the hot turbine from overheating.

When it is necessary that the hot turbine 37 supply power to shaft 39, to make up for an inadequate power supply from cold turbine 30, actuating ring 201 is rotated in such direction that, through links 206, cranks 207 and shafts 208, the vanes 210 are rotated counterclockwise as viewed in Figures 8 and 10, for example to the maximum power position illustrated in Figure 10. The radial inflow of air is then generally in the direction of shaft rotation (the same as the direction of rotation of cold turbine 30), so that the air impinges against the turbine blades 194 and operates to add power to shaft 39. Should the cold turbine 30 be supplying an excessive amount of power, so that it is necessary for hot turbine 37 to act as a brake, actuating ring 201 is rotated in the opposite direction to effect clockwise rotation of nozzle vanes 210, for example to the maximum braking position shown in Figure 10. The radial inflow of air is then in a direction opposite to the direction of shaft rotation, causing the inflowing air to impinge against the blades 194 in a manner to brake the same and thus tend to slow down the shaft 39. It is in this manner that the hot turbine acts selectively as a shutoff valve, a power source and a brake.

In order to rotate the actuating ring 201 and thus effect corresponding adjustment of all of the nozzle vanes 210 as indicated, a pair of diametrically opposite shafts 208 are provided with extensions 208a which project rearwardly through the casing 198 to the exterior as illustrated in Figure 9. Fixedly mounted on the outer end of each extension 208a is a crank 214 having a cam follower roller 216 on its outer end. The roller 216 is inserted, as best shown in Figure 8, in a curved cam slot 217 in a cam plate 218, the cam plate being pivoted on a shaft 219 which is suitably supported on the casing of the apparatus.

A crank 221 also pivoted on shaft 219 is fixedly associated with each cam plate 218, and is connected through a pivoted link 222 to the rod 223 of a piston 224 or 225. With the described construction, shifting of the pistons 224 and 225 in opposite directions will operate to rotate the cam plates 218 and thus, through the cam follower rollers 216, rotate the cranks 214 in opposite directions and accordingly pivot the shafts 208a and cranks 207 to rotate the actuating ring 201 and thus the nozzle vanes 210.

As in the case of the vane actuating structure described in connection with the cold turbine 30, the vane actuating means are non-linear in such manner that shifting of the pistons through a given distance when the vanes are nearly closed has a much lesser effect than when the vanes are either in their fully open power or fully open braking positions. Also as described in connection with the cold turbine, the pistons must act oppositely since they are associated with vanes on diametrically opposite portions of the turbine.

The pistons 224 and 225 form components of a servo, indicated at 227 in Figures 1 and 8, which in turn forms part of the speed control group 44. Servo 227 additionally comprises a casing 228 having piston chambers 229 and 230 formed therein for reception, respectively, of the pistons 224 and 225. A passage 231 is provided through casing 228 between the upper end of chamber 229 and the lower end of chamber 230. Conversely, a second passage 232 through casing 228 extends between the lower end of chamber 229 and the upper end of chamber 230. Passages 231 and 232 communicate, respectively, through conduits 233 and 234 with a governor 236 represented schematically in Figure 1 and which also forms part of speed control group 44. Governor 236, which is geared to shaft 39, is not described in detail in the present application for the reason that it is, in its essential elements, described in detail in United States Patent No. 2,478,753, issued August 9, 1949, to George E. Parker, for a Condition Regulating Apparatus. Referring to Figure 2 of the drawings of that patent, the passages which lead into opposite ends of the cylinder chamber 13 are instead, in the instant construction, connected through the conduits 233 and 234 with the chambers 229 and 230 shown in Figure 8 of the present drawings.

The operation of the governor described in the above-cited patent is such that the vanes 210 of the hot turbine of the present construction close when cold turbine 30 is supplying the exact amount of power required to rotate shaft 39 at the desired constant speed, open in a direction to supply power to shaft 39 when the cold turbine is not supplying sufficient power thereto, and open in a direction to brake shaft 39 when the cold turbine is supplying excessive power thereto. In this manner, the speed of shaft 39 is maintained at a predetermined constant within close limits, an illustrative constant being 31,500 revolutions per minute.

Latching mechanisms 237 shown in Figure 8 may be provided to lock the nozzle vanes 210 in a desired position when the system is not operating and, accordingly, no oil pressure is supplied thereto. Each latch mechanism 237 comprises a notch 238 formed in a cam plate 218 and adapted to receive a detent 239. Detent 239 extends into a chamber 241 in casing 228 and has a piston 242 at its end remote from the cam plate. A compression spring 243 bears against the piston 242 to urge the detent against cam plate 218, adjacent shaft 219, at all times when no oil under pressure is introduced into the lower end of chamber 241 through an oil inlet 244. In this way the cam plates 218, and thus the nozzle vanes 210, become locked when the detent 239 is registered with notch 238 and insufficient oil pressure is present at inlet 244 due to stopping of the air conditioning and accessory drive system or for other reasons.

*Description of the pressure limiting and overspeed control group 46*

As previously indicated, the function of group 46 is to operate the valve 47 in such a way that the pressure in the system never exceeds a predetermined maximum such as 200 inches of mercury absolute so that heat exchanger 24 and other components may be made light and weak in construction. The group also operates to close the valve 47, and thus effect stopping of the turbines, should the speed of shaft 39 become excessive due to improper operation of speed control group 44. The group 46 is illustrated in block form at the upper left portion of Figure 1, and in schematic form in Figure 11.

Group 46 comprises a servo 246 associated with valve 47, a pilot 247 for controlling the servo, and an overspeed kicker 248 adapted to override the pilot 247 and to effect operation of the servo to close valve 47 should shaft speed become excessive. Overspeed kicker 248 is controlled by an overspeed trip 249 which, in turn, is operated by a centrifugal device 251 on shaft 39. As shown in Figure 1, two overspeed trips 249 and centrifugal devices 251 may be operated in parallel in order to assure that at least one will operate the overspeed kicker 248 should shaft speed become excessive. The respective trips 249 and centrifugal devices 241 are disposed as close as possible to the respective turbines 30 and 37, which means that at least one will operate even though a central portion of shaft 39 breaks.

Figure 11:
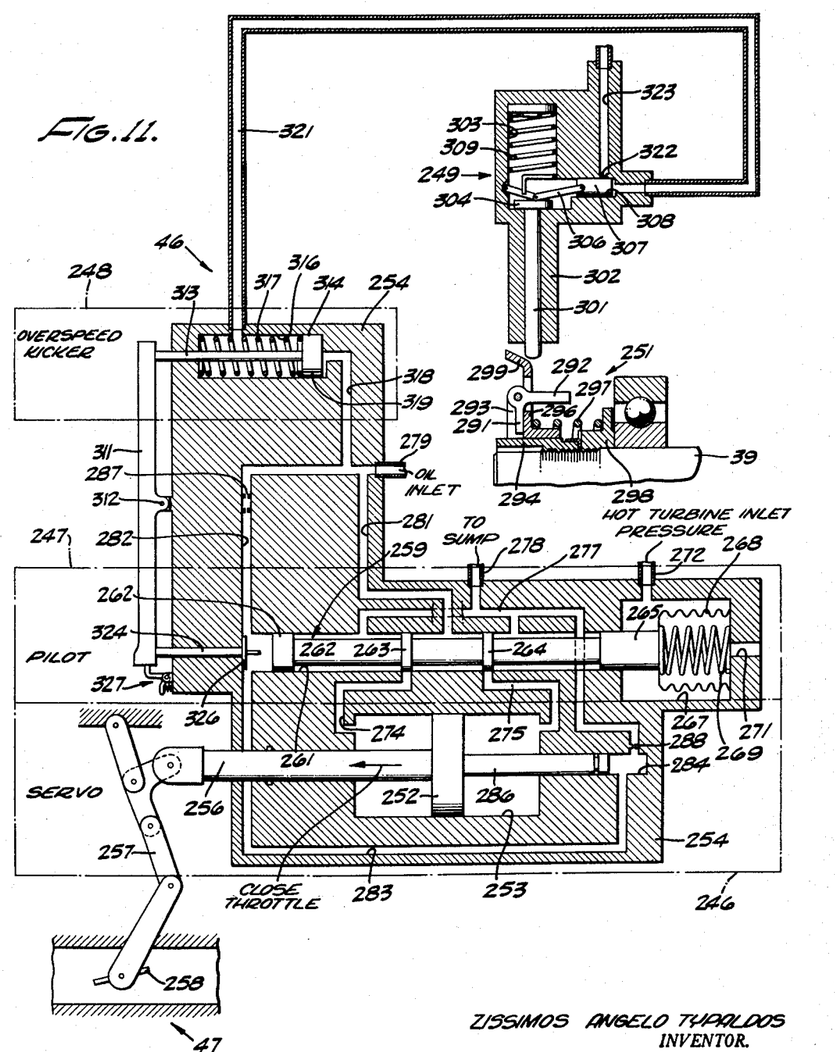
Figure 11 is a schematic representation of the pressure-limiting and overspeed control group adapted to prevent the conditioning system from being subjected to excessive pressures and also to prevent the mechanical elements of the system from moving at excessively high rotational speeds.

Referring to Figure 11, the various elements 246—248 are shown enclosed individually by dashed line blocks, and only one centrifugal device 251 and overspeed trip 249 are shown. The servo 246 comprises a double acting piston 252 mounted in a piston chamber 253 in the common casing 254 for all of the devices 246—248. A piston rod 256 extending axially from one side of piston 252 projects slidably through casing 254 and is connected to a linkage 257 leading to the butterfly 258 of valve 47. As in the case of the actuating mechanisms for the hot and cold turbine nozzle vanes, the linkage 257 is nonlinear so that a given displacement of piston 252 produces a much smaller butterfly rotation when the butterfly is approaching its closed position than when the butterfly is in its fully open position.

In addition to the servo means 246 for operating the shut-off or throttle valve 47, suitable motor means, not shown, may be employed to shut the valve 47 during starting and stopping of the jet engine. These motor means only operate during starting and stopping and are overriden by the servo 246 during jet engine operation.

The pilot 247 comprises a spool 259 mounted in an elongated bore 261 in casing 254 and has four axially spaced lands 262—265. One of the lands, number 265, extends out of bore 261 and into an air pressure chamber 267, where it is secured to the closed end of a bellows 268. A spring 269 is provided interiorly of bellows 268 to urge spool 259 towards the left in Figure 11, the spring seating against one end of casing 254 and in which is provided a port 271 to the ambient atmosphere. A tap line 272 communicating with chamber 267 leads to a suitable tap 273 (Figure 1) at the inlet of hot turbine 37. It follows that when the pressure at the hot turbine inlet (or downstream of shut-off valve 47) increases, the bellows 268 will collapse and operate to shift spool 259 to the right. On the other hand, when the same pressure decreases, the spring 269 will become operative to expand the bellows and shift the spool to the left.

When the spool 259 is in its balanced or neutral position, shown in the drawing, land 263 operates to block flow of oil through a passage 274 to the left end of piston chamber 253, and land 264 operates to block flow of oil through a passage 275 to the right end of the piston chamber. Portions of bore 261 between lands 262 and 263, and 264 and 265, respectively, then communicate through suitable passage means 277 with a conduit 278 leading to a sump, not shown. A high pressure oil inlet conduit 279 leads from a suitable source of oil pressure, not shown, and through a passage 281 to the portion of bore 261 between lands 263 and 264.

With the construction thus far described, it will be understood that an increase in the pressure at the intake of hot turbine 37 will operate to shift spool 259 to the right and thus effect communication between oil inlet passage 281 and passage 275 to the right end of piston chamber 253, while at the same time effecting communication between the left end of chamber 253 and the sump via passages 274 and 277. Oil under pressure is thus introduced into the right end of chamber 253 and is drained from the left end thereof, so that piston 252 shifts to the left and effects closing of shut-off valve 47 as is necessary to reduce the pressure to the desired amount such as 200 inches of mercury absolute. When the pressure in the system drops to below 200 inches of mercury absolute, pilot 247 operates in the reverse direction to effect shifting of piston 252 to the right, with resultant opening of valve 47. The balance of forces in the system is such that valve 47 is fully open at all times when the inlet pressure at the hot turbine 37 is below a predetermined maximum such as the 200 inches of mercury absolute given in the example. When, however, the inlet pressure to the hot turbine increases above 200 inches of mercury absolute, the pilot and servo means modulate the valve 47 so that the pressure at the hot turbine inlet lowers to 200 inches of mercury absolute and remains there.

To amplify upon the preceding paragraph, the forces acting against spool 259 are such that the spool will balance at the illustrated position, with lands 263 and 264 adjacent the respective passages 274 and 275, when the hot turbine inlet pressure is 200 inches of mercury. Any time the hot turbine inlet pressure increases above 200 inches of mercury the diaphragm 268 causes shifting of spool 259 to the right, with resultant closing of valve 47 as necessary to relieve the pressure. As soon as the pressure then drops to below 200 inches of mercury, spool 259 moves sufficiently far to the left, due to expansion of bellows 268 and the pressure of spring 269, that oil is admitted to the left end of piston chamber 253 and drained from the right end thereof to effect actuation of valve 47 to its open position. The valve then remains open at all pressures below 200 inches of mercury, and despite the fact that oil pressure is still acting against the left side of piston 252, since the valve is then in its extreme open position and is prevented by suitable stop means from shifting further.

Similarly to the case of the mass flow control group 43, feedback means are employed to stabilize the operation of the pilot 247 and servo 246. The feedback means include a passage 282 leading from oil inlet 279 to the end of bore 261 remote from bellows 268. A second passage 283 leads from said bore end to a feedback chamber 284, the latter also forming a piston chamber into which is inserted a piston rod 286 connected to the opposite side of piston 252 from rod 256. An extension of passage means 277 communicates with feedback chamber 284 and permits drainage of oil therefrom. Restrictor means 287 and 288 are provided, respectively, in passage 282 and in the extension of passage 277 adjacent feedback chamber 284.

In the operation of the feedback means, high pressure oil from inlet 279 takes a substantial drop in pressure at restrictor 287, so that the pressure between restrictors 287 and 288 is only a fraction of that delivered to bore 261 from inlet 279. This lower pressure acting against the left end of spool 259 is one of the forces which balance the spool in the illustrated position, and remains constant so long as the spool and the piston 252 do not move. Let it be assumed, however, that the spool 259 moves to the right due to an increase of pressure at the hot turbine inlet, which results in shifting of piston 252 to the left in order to close valve 47. The movement of piston 252 to the left operates to increase the volume of chamber 284 and thus reduce the feedback pressure between restrictors 287 and 288. The pressure acting against the left end of spool 259 is thus decreased, so that the spool tends to move to the left and reset itself to the illustrated neutral position as desired to prevent overaction of the pilot and servo. The reverse operation, coused by a pressure drop at the hot turbine inlet, produces a converse feedback effect such that spool 259 again resets itself as desired.

Each centrifugal device 251 comprises a plurality of bell crank levers each having a radial arm 291 and an axial arm 292. The bell cranks are pivoted to lugs 293 which in turn are integral with a sleeve 294 rigidly affixed to shaft 39 for rotation therewith. A trip ring 296, through openings in which axial arms 292 extend, is slidably mounted on sleeve 294 and is biased against lugs 293 by a compression spring 297, the latter being suitably seated against a collar 298 on the shaft. Trip ring 296 is provided with a beveled flange 299 adapted to depress a trip pin component 301 of overspeed trip 249.

Each overspeed trip 249 comprises a casing 302 through which trip pin 301 slidably extends, the casing having a chamber 303 formed therein and receiving a disc 304 provided at the inner end of the trip pin. A flat toggle linkage 306 is pivoted at one end to casing 302 and extends transversely within chamber 303 for pivotal connection with a piston 307 which is slidably mounted in a piston chamber 308. A compression spring 309 in chamber 303 operates to urge the toggle linkage 306 downwardly against disc 304 to provide a resetting action. The overspeed trip 249 is normally in its position illustrated in Figure 11, with toggle linkage 306 jackknifed downwardly against disc 304 and with piston 307 inserted substantially fully into its chamber 308.

The overspeed kicker 248 comprises a lever 311 centrally pivoted at 312 on the exterior of casing 254. The upper end of the lever normally bears against the piston rod 313 of a piston 314 which is disposed within a chamber 316 in the upper portion of casing 354. A compression spring 317 within chamber 316 urges piston 314 to the right; that is, against the right end of the chamber.

A passage 318 connects between oil inlet 279 and the right end of piston chamber 316, and a small diameter groove or passage 319 is provided through piston 314 for the purpose of permitting a very slow leakage of oil from inlet 279 into the chamber 316. Chamber 316 also connects through a conduit 321 with the right end of piston chamber 308 of overspeed trip 249, as viewed in Figure 11. Normally, fluid flow through the piston chamber 308 from conduit 321 is blocked by the piston 307, but upon shifting of the piston 307 to the left in Figure 11 oil may flow from conduit 321 and through a restriction 322 to a passage 323 leading through casing 302 to the sump.

In the operation of the overspeed control elements, the centrifugal device 251, overspeed trip 249, and kicker 248 are, as previously stated, normally in the positions shown in Figure 11. At that time, oil pressure acting against piston 307 operates to jackknife toggle linkage 306 downwardly against disc 304 to thus hold pin 301 in its lowermost position, this operation being aided by the reset spring 309. The pressure in chamber 316 and the communicating conduit 321 is then substantially the same as that at oil inlet 279, due to the fact that all outlet from the chamber 316 is blocked by the piston 307.

When the common shaft 39 of the hot and cold turbines reaches its desired operating speed, for example 31,500 revolutions per minute, the axial arms 292 of the centrifugal device bell cranks tend to fly outwardly sufficiently to force radial arms 291 against trip ring 296 and urge the latter to the right in Figure 11, against the bias of spring 297. As shaft speed increases, trip ring 296 is shifted further to the right until, at a predetermined speed such as 34,000 revolutions per minute, the trip ring shifts sufficiently far to enable its beveled flange 299 to press trip pin 301 a distance sufficient to cause toggle linkage 306 to go past center. As soon as the toggle linkage has been pushed past center, the oil pressure acting against piston 307 pushes the latter a substantial distance to the left in Figure 11, whereupon restriction 322 is uncovered and oil begins to bleed from chamber 316 through conduit 321 and then through passage 323 to sump. This bleeding of oil from chamber 316 is, because of the relative sizes of passage 319 and restriction 322, substantially faster than the inflow of oil from passage 318 into chamber 316.

A substantial differential between the pressures on opposite sides of piston 314 is thus created, resulting in displacement of piston 314 to the left and causing counterclockwise pivoting of lever 311 until the lower end of the lever engages casing 254 which acts as a stop. An actuating pin 324 which bears against the lower end of lever 311 is thus shifted to the right a distance sufficient to cause it to engage spool 259 of pilot 247, override the action of bellows 268 and spring 269, and shift spool 259 to the right. The spool 259 having been shifted to the right, oil is admitted into the right end of piston chamber 253 and bled from the left end thereof, whereupon piston 252 is shifted to the left and valve 47 is caused to move to its fully closed position.

As soon as valve 47 closes, all flow of air to the cold and hot turbines is shut off, and the speed of shaft 39 begins to diminish. After a sufficient reduction in shaft speed, spring 297 shifts trip ring 296 away from pin 301 and back to its illustrated position. The reset spring 309 then becomes operative to force toggle linkage 306 to its illustrated downwardly jack-knifed position, thereby causing pin 301 to move back to its lower position. This resetting of the toggle linkage is made possible since a relatively low pressure is at this time acting against the outer face of piston 307, the high pressure having been bled through restriction 322 to the passage 323 leading to sump. Oil then continues to flow from the oil inlet 279 through passage 319 into chamber 316, resulting in a build up of pressure in the chamber 316 and, through conduit 321, against the piston 307. As the pressure in chamber 316 builds up, the pressures against opposite faces of piston 314 become relatively equal so that spring 317 becomes operative to shift the piston 314 to the right.

The lever 311 would then normally tend to resume its ilustrated vertical position, since a disc 326 at the right end portion of pin 324 is adapted to operate as a piston to shift pin 324 outwardly against the lower end of lever 311 and thus pivot it, this outward motion being stopped as soon as disc 326 engages the wall of casing 254. However, this resetting operation, which would permit spool 259 to resume a position such that valve 47 would open, is not desired unless a manual operation by the pilot of the airplane is performed. Accordingly, a latch 327 is associated with lever 311 to hold the lower end of the lever at its pivoted position, so that pin 324 is maintained against spool 259 until manual release of the latch.

Latch 327 will normally not be released until the system has been repaired and the condition causing the undesired overspeed of shaft 39 corrected. However, if under emergency conditions the pilot desires the system to commence operating, he merely releases the latch 327 through a suitable remote control arrangement. Thereupon, spool 259 is permitted to shift to the left and result in opening of valve 47, since the pin 324 is no longer held against the spool by the latching action. The opening of valve 47 will effect recommencement of operation of the turbines and, unless the overspeed condition has been corrected, shaft 39 will increase to a speed at which the overspeed tripping action occurs again. The pilot of the airplane can then, as he desires, periodically release the latch 327 to effect recycling and intermittent operation of the system.

*Summary*

The general method of operation of the over-all system having been described at the beginning of the present specification, under the heading Description of the Over-All System and Method, the functions of the various elements will now be summarized. The throttle and shutoff valve 47 controls the flow of bleed air from jet engine compressor 20 through conduit 22 and, as governed by the pressure limiting and overspeed control group 46, insures that the pressure in the system never exceeds a predetermined maximum such as 200 inches of mercury absolute. Not only does the valve 47 limit the pressure so that the components of the system may be made relatively light, but it also, again under control of group 46, shuts off all flow of air when the speed of shaft 39 becomes dangerously high.

The bypass valve 27 acts in response to the temperature in cabin 33, due to operation of the temperature control 168 and motor 167, to vary the proportional amounts of air flowing through heat exchanger 24 and bypass 26 therearound. The amount of initial cooling of the bleed air, before it passes to the cold turbine 30, is thus regulated in such a way as to maintain cabin temperature within a desired range.

The cold turbine 30 receives air at a given temperature from the heat exchanger 24 and bypass 26, and permits it to expand while doing work so that an additional cooling function is provided. Accordingly, when valve 27 is adjusted so that substantially all of the air to the cold turbine flows through heat exchanger 24, the heat exchanger and cold turbine 30 combine to provide a very substantial cooling function.

The mass flow control group 43 controls the vanes of cold turbine 30 in such a way that the flow of air through conduit 31 to the cabin will be constant, for example at 40 pounds of air per minute. This control of the cold turbine vanes is made necessary by variations in such factors as cabin pressure and the temperature and pressure of the air delivered to the cold turbine inlet, as determined by various engine conditions and by various settings of valves 47, 27 and 34.

The hot turbine 37 serves to maintain the speed of shaft 39 constant despite wide variations in the power delivered thereto by cold turbine 30. Thus, the hot turbine sometimes acts as a power source to supply power to the shaft and make up for the inadequacy of cold turbine 30, and sometimes, depending upon the angular adjustment given to the hot turbine nozzle vanes 210, acts as a brake to absorb excess power delivered to the shaft by the cold turbine. The speed control group 44 controls the vanes of hot turbine 37 to maintain the speed of shaft 39 constant within close limits, as required by the load 42 and particularly the radar components thereof. When the cold turbine 30 is operating to supply the exact required amount of power to shaft 39 and the load, hot turbine 37 acts neither as a brake nor as a power source, but instead acts as a shut-off valve to prevent flow of bleed air through conduit 36.

After a reading of the above description, it will be understood by those skilled in the art that various modifications may be made without departing from the basic two-turbine principle. For example, instead of varying the nozzle vanes of cold turbine 30 in order to maintain a predetermined air flow to the cabin, it would be possible to provide a separate modulating valve and control for that purpose. However, the described arrangement by which the cold turbine vanes are themselves varied in order to provide the valve action is preferred because of efficiency and other reasons. Additionally, and with respect to hot turbine 37, it would be possible to provide the braking action by reversing the direction of flow through the turbine, that is to say interchanging the inlet with the outlet, instead of by adjusting the nozzle vanes. Such a reversing system, in conjunction with an automatic shut-off valve, would produce a similar effect on shaft 39 but would be much more complicated and less efficient than the present highly novel structure. Other possible changes involve placing the flow senser 71 upstream from cold turbine 30 instead of downstream therefrom, and providing an additional bypass which bypasses cold turbine 30.

In some aircraft, and under some conditions, the supplied compressed air may be at a lower temperature than the desired cold turbine exhaust temperature. For such situations the hot turbine of the two-turbine system may be made to pass air so that it produces more power than is required by the load. The excess power is then absorbed by the cold turbine, which may be made to operate as a brake, with the result that the bleed air passing through the cold turbine is warmed to the desired exhaust temperature.

The present two-turbine system, incorporating the highly efficient hot turbine 37 which operates selectively as a brake, as a shut-off valve, and as a power supply turbine with a high temperature and pressure ratio, has a greater operating range and lesser bleed air consumption than any prior art system of comparable capacity. Because of the effective use of bleed air, and because of the feature whereby the heat exchanger need only pass the cabin conditioning air, the heat exchanger and the turbines may be made small in size. The apparatus can not only cool but also heat the delivered air, rendering heaters unnecessary, and can absorb excess power so that the necessity for heating coils and other power sinks is eliminated.

The words "shut-off," "closed," "flow-preventing," "flow-blocking," etc., as employed in the present specification and claims relative to the nozzle vane structure of the hot turbine, are intended to mean substantial blocking, closure or shut-off since complete closure for any extended period of time would result in overheating of the hot turbine because of failure to pass sufficient cooling air therethrough.

While the particular method and apparatus herein shown and disclosed in detail are fully capable of attaining the objects and providing the advantages hereinbefore stated, it is to be understood that they are merely illustrative of the presently preferred embodiments of the invention and that no limitations are intended to the details of construction or design herein shown other than as defined in the appended claims.

I claim:

1. In a system for air conditioning a compartment and for driving a load, an expansion engine adapted to communicate through its inlet with a source of air under pressure and through its outlet with said compartment, means to connect said engine to said load for driving thereof, the expansion of air from said source through said engine and consequent driving of said load serving to effect cooling of said air prior to its delivery to said compartment, and means including means responsive to flow conditions prevailing in said air conditioning system for maintaining the speeds of said engine and load at predetermined values despite indeterminate variations in said load and in the pressure or temperature of said air passing through said engine.

2. In a system for air conditioning a compartment and for driving a load, an expansion engine adapted to be connected through its inlet to a source of air under pressure and through its outlet to said compartment, means to connect said engine to said load for driving thereof, the expansion of air from said source through said engine and consequent driving of said load serving to effect cooling of said air prior to its delivery to said compartment, means responsive to flow of air to adjust to a predetermined value the rate of flow of said air through said engine to said compartment, and means for supplementing and absorbing power from said engines as necessary to operate said engine at a predetermined speed to drive said load at a related predetermined speed.

3. A vehicle compartment conditioning and accessory drive system, which comprises a first expansion engine adapted to be connected through its inlet to a source of air under pressure and through its outlet to a compartment to be conditioned, a second expansion engine adapted to be connected through its inlet to a source of gas under pressure and through its outlet to a low pressure discharge area separate from said compartment, means to operatively associate said first and second engines with each other and with an accessory to be driven, and means associated with one of said engines to cause it to act selectively as a brake and as a power source in order to effect operation of said accessory at a predetermined speed.

4. A vehicle compartment conditioning and accessory drive system, which comprises a first expansion engine adapted to communicate through its inlet with a source of air under pressure and through its outlet with a compartment, means to adjust to a predetermined rate the flow of air through said first expansion engine to said compartment, a second expansion engine adapted to be connected through its inlet to a source of gas under pressure and through its outlet to a low pressure discharge area separate from said compartment, means to mechanically associate said first and second engines with each other and with an accessory to be driven, and means associated with said second engine to cause it to act selectively as a brake and as a power source in order to effect operation of said accessory at a predetermined speed.

5. A combination compartment conditioning and drive system, which comprises a first expansion engine adapted to be connected through its inlet to a source of air under pressure and through its outlet to a compartment, a second expansion engine adapted to be connected through its inlet to a source of gas under pressure and through its outlet to a low pressure discharge area, means to mechanically associate said first and second engines with each other and with a load to be driven, means associated with said second engine to cause it to act selectively as a brake and as a power source as conditions require to effect operation of said load at a predetermined speed, and means responsive to load conditions to block the flow of gas through said second engine when the power delivered by said first engine just balances the power requirements of said load.

6. The invention as claimed in claim 5, in which means are provided to adjust automatically to a predetermined rate the flow of air through said first expansion engine to said compartment.

7. A drive system, which comprises a first turbine and a second turbine, means to mechanically associate said first and second turbines with each other and with a load to be driven, means to pass fluid through said first turbine in such manner as to cause it to supply power to said load, and means responsive to flow conditions within said drive system to pass fluid through said second turbine in such manner as to cause it to act selectively as a source of power and as a brake to thus effect driving of said load at a predetermined speed despite indeterminate variations in the power output of said first turbine and in the power requirements of said load.

8. The invention as claimed in claim 7, in which the last named means additionally operates to limit automatically the flow of fluid through said second turbine during intervals when the power output of said first turbine balances the power requirements of said load.

9. A system for air conditioning the passenger compartment of a vehicle and for driving a load which may include accessories of the vehicle, said vehicle having air supply means thereon for supplying air under compression, which comprises a first expansion turbine and a second expansion turbine, means to connect said first and second turbines to load to effect operation of the latter due to the combined effect of both of said turbines, means to pass air from said air supply means through said first turbine and to said passenger compartment to thus supply power to said load and supply cooled air to said passenger compartment, means to pass air from said air supply means through said second turbine and to a discharge outlet other than said passenger compartment, and means to direct the flow of air through said second turbine in such manner as to cause it to act selectively as a brake and as a source of power and thus effect operation of said load at a predetermined speed despite variations in the output of said first turbine and in the power requirements of said load.

10. The invention as claimed in claim 9, wherein means are provided to block the flow of air through said second turbine when the power output of said first turbine just balances the power requirements of said load.

11. The invention as claimed in claim 9, in which means are provided to adjust the flow of air through said first turbine to said passenger compartment to a predetermined mass flow rate.

12. The invention as claimed in claim 9, in which means are provided to cool the air from said air supply means prior to its passage through said first turbine.

13. A system for air conditioning the passenger compartment of a jet engined airplane and for driving at a constant speed a load comprising accessory units of the airplane, which comprises a first expansion turbine and a second turbine, means to connect mechanically the impellers of said turbines with each other and with said load to drive the latter, first conduit means to conduct compressed air from the jet engine of said airplane to the inlet of said first turbine for expansion therethrough, second conduit means to conduct air cooled by said expansion from the outlet of said first turbine to said passenger compartment to air condition the same, third conduit means to conduct compressed air from said jet engine to said second turbine, and means to cause said compressed air at said second turbine to pass through said second turbine in a direction such that said second turbine acts selectively as a source of power and as a brake to effect constant speed operation of said load despite variations in the power output of said first turbine and in the power requirements of said load.

14. The invention as claimed in claim 13, in which the connection of said third conduit means between said jet engine and said second turbine is direct, but in which heat exchanger means are interposed in said first conduit means to effect precooling of compressed air delivered to said inlet of said first turbine.

15. A system for air conditioning the passenger compartment of a jet engined airplane and for driving at a constant speed a load comprising accessory units of the airplane, which comprises a first expansion turbine and a second expansion turbine, means to mechanically connect said turbines with each other and with said load to effect driving of said load, first conduit means to conduct compressed air from the jet engine of said airplane to the inlet of said first turbine for expansion therethrough, second conduit means to conduct air cooled by said expansion from the outlet of said first turbine to said passenger compartment for pressurizing and air conditioning of the latter, third conduit means to conduct compressed air from said jet engine to the inlet of said second turbine, fourth conduit means to conduct air from the outlet of said second turbine to the ambient atmosphere, and variable nozzle vane means provided in said second turbine for directing air therethrough selectively in the direction of rotation of the rotor thereof and against the direction of rotation of the rotor thereof to thus cause said second turbine to act selectively as a source of power and as a brake in order to result in driving of said load at a predetermined speed despite variations in the requirements of said load and in the power supplied by said first turbine.

16. The invention as claimed in claim 15, in which said nozzle vane means additionally operates, when the output of said first turbine balances the power requirements of said load, to shut off the flow of air through said second turbine.

17. The invention as claimed in claim 15, in which means are provided to adjust to a predetermined value the rate of flow of air through said first turbine and to said passenger compartment.

18. The invention as claimed in claim 15, in which said first conduit means includes a pre-cooler and a bypass therearound, and in which means are provided to adjust the relative proportions of air flowing through said precooler and bypass in order to regulate the temperature of air delivered to said compartment.

19. The invention as claimed in claim 15, in which means responsive to the speed of said load are provided for effecting automatic adjustment of said nozzle vane means.

20. The invention as claimed in claim 15, in which valve means are provided in said first and third conduit means, and control means are provided to operate said valve means to shut-off position in the event of overspeed operation of said load.

21. The invention as claimed in claim 20, in which said control means additionally operate to control said valve means in such manner that the pressure of air delivered to said first and second turbines remains below a predetermined maximum.

22. In a combined compartment conditioning and drive system, a cold turbine of the expansion type having variable nozzle means, the inlet of said cold turbine being adapted to be connected to a source of compressed air and the outlet thereof being adapted to be connected to the compartment to be conditioned, means responsive to the rate of mass flow of air through said cold turbine to said compartment to vary said nozzle means so that said mass flow rate remains constant, a hot turbine adapted at its inlet to be connected to a source of pressure fluid, said hot turbine having variable nozzle vanes adapted when in a first position to direct pressure fluid in the direction of rotation of the rotor of said hot turbine and when in a second position to direct pressure fluid against the direction of rotation of said rotor, means to mechanically connect said hot turbine rotor to the rotor of said cold turbine and to a load, and means responsive to the speed of said load to adjust said hot turbine nozzle vanes between said first and second positions to cause said load speed to remain constant.

23. The invention as claimed in claim 22, in which said hot turbine nozzle vanes are adapted when in a third position to shut down the flow of pressure fluid through said hot turbine, and said load speed responsive means are adapted to cause said nozzle vanes to assume said third position when said cold turbine is producing an amount of power which just balances the requirements of said load.

24. In a combined compartment conditioning and drive system, a cold turbine of the expansion type having variable nozzle means, the inlet of said cold turbine being adapted to be connected to a source of compressed air and the outlet thereof being adapted to be connected to the compartment to be conditioned, means responsive to the rate of mass flow of air through said cold turbine to said compartment to vary said nozzle means so that said mass flow rate remains constant, a hot turbine of the expansion type adapted at its inlet to be connected to said source of compressed air and at its outlet to be connected to the ambient atmosphere, said hot turbine having variable nozzle vanes adapted when in a first position to direct air in the direction of rotation of the rotor of said hot turbine and when in a second position to direct air in a direction opposite to the direction of rotation of said rotor, means to connect said rotor to the rotor of said cold turbine and to a load, and means responsive to the speed of said load to adjust said hot turbine nozzle vanes between said first and second positions to cause said load speed to remain constant.

25. In an aircraft, a source of compressed air, a first turbine and of the expansion type, a cabin substantially sealed against leakage of air therefrom, first conduit means to conduct air from said source through said first turbine and to said cabin, means to cause the rate of air flow through said first conduit means to said cabin to remain at a predetermined value, means to effect controlled discharge of air from said cabin and at such rate that the pressure in said cabin remains at a predetermined value and above ambient pressure, a second turbine, second conduit means to conduct air from said source through said second turbine and to the ambient atmosphere, means to mechanically connect said first and second turbines to each other and to a load for driving of the latter, and means responsive to the speed of said load to direct the flow of air through said second turbine in such direction that said second turbine acts selectively as a brake and as a power source to effect driving of said load at a predetermined speed.

26. In a jet-propelled aircraft, jet engine compressor means to provide a source of compressed air under varying pressure, first and second expansion turbines having their rotors mechanically connected to each other and to a load comprising accessories of said aircraft, a cabin substantially sealed against leakage of air therefrom, a bleed air conduit connected to said compressor means to receive bleed compressed air therefrom, a heat exchanger conduit connected between said bleed air conduit and the inlet of said first turbine, heat exchanger means in said heat exchanger conduit to effect cooling of air flowing therethrough, a bypass conduit around said heat exchanger means and controlled by a bypass valve, a cabin air conduit to conduct cooled expanded air from the outlet of said first turbine to said cabin, valve means to effect controlled discharge of air from said cabin at such rate as to maintain said cabin at a desired pressure above ambient, conduit means to conduct air from said bleed air conduit directly to the inlet of said second turbine and from the outlet of said second turbine directly to the ambient atmosphere without passing through said cabin, and means responsive to the speed of said load to cause said second turbine to act selectively as a brake and as a source of power to effect operation of said load at predetermined speed.

27. The invention as claimed in claim 26, in which means responsive to the temperature in said cabin are provided for operating said bypass valve in a manner to produce a desired cabin temperature range.

28. The invention as claimed in claim 26, in which a shut-off valve is provided in said bleed air conduit upstream from its connections to said heat exchanger conduit and said conduit means, and in which control means responsive to the pressure downstream from said shut-off valve and also responsive to the speed of said load are provided for operating said shut-off valve in a manner to limit the pressure downstream therefrom and to prevent overspeed of said load.

29. In a jet-propelled aircraft, jet engine compressor means to provide a source of compressed air, first and second expansion turbines having their rotors mechanically connected to each other and to a load comprising accessories of said aircraft, a cabin substantially sealed against leakage of air therefrom, a bleed air conduit connected to said compressor means to receive bleed compressed air therefrom, first conduit means to connect said bleed air conduit to the inlet of said first turbine, a cabin air conduit to conduct cooled expanded air from the outlet of said first turbine to said cabin, valve means to effect controlled discharge of air from said cabin at such rate as to maintain said cabin at a desired pressure which is normally above ambient, second conduit means to conduct air from said bleed air conduit directly to the inlet of said second turbine and from the outlet of said second turbine directly to the ambient atmosphere without passing through said cabin, mass flow control means to maintain the air flow through said cabin air conduit to said cabin at a predetermined constant value, and speed control means to effect operation of said turbines and load at a predetermined constant speed.

30. The invention as claimed in claim 29, in which said mass flow control means comprises nozzle vanes on said first turbine and which are adjustable between fully open and substantially closed positions, and means responsive to the rate of mass flow of air through said cabin air conduit to adjust said vanes.

31. The invention as claimed in claim 29, in which said speed control means comprises nozzle vanes on said second turbine and which are adjustable between a position at which inlet air is directed by said nozzle vanes in the direction of rotation of the rotor of said second turbine, a second position at which flow of air through said second turbine is blocked, and a third position at which inlet air is directed by said nozzle vanes in a direction opposite to the direction of rotation of said second turbine rotor; and in which means responsive to the speed of said load are provided for adjusting said nozzle vanes.

32. In an air conditioning and drive system, a pair of rotary devices mechanically connected to each other and to a load, first conduit means to pass air from an air pressure source through one of said devices to a space to be air conditioned, and second conduit means to pass gas from a gas pressure source through the other of said devices to the ambient atmosphere, said one device being constructed to act as a combined expansion turbine and throttle valve to provide a predetermined flow of expanded aid to said space while supplying power to said load, said other device being constructed to act selectively as a power turbine, braking turbine and shut-off valve to maintain the speed of said load at a predetermined value.

References Cited in the file of this patent

UNITED STATES PATENTS

| | | |
|---|---|---|
| 960,289 | Dutton | June 7, 1910 |
| 1,250,238 | Spitzglass | Dec. 18, 1917 |
| 1,401,668 | Brown et al. | Dec. 27, 1921 |
| 1,508,017 | Greve | Sept. 9, 1924 |
| 1,961,813 | Caughey | June 5, 1934 |
| 2,373,621 | Wales | Apr. 10, 1945 |
| 2,444,952 | Paget | July 13, 1948 |
| 2,491,462 | Wood | Dec. 13, 1949 |
| 2,539,430 | Jepson et al. | Jan. 30, 1951 |
| 2,557,101 | Mayer | June 19, 1951 |
| 2,618,470 | Brown et al. | Nov. 18, 1952 |
| 2,693,088 | Green | Nov. 2, 1954 |
| 2,718,751 | Huber | Sept. 27, 1955 |
| 2,734,356 | Kleinhans | Feb. 14, 1956 |
| 2,734,443 | Wood | Feb. 14, 1956 |
| 2,851,863 | Theed | Sept. 16, 1958 |

FOREIGN PATENTS

| | | |
|---|---|---|
| 1,034,159 | France | Apr. 8, 1953 |